United States Patent [19]

Geisthoff

[11] 4,226,316
[45] Oct. 7, 1980

[54] TORQUE LIMITING CLUTCH ASSEMBLY WITH FREEWHEELING ACTION

[75] Inventor: Hubert Geisthoff, Lohmar, Fed. Rep. of Germany

[73] Assignee: Jean Walterscheid GmbH, Lohmar, Fed. Rep. of Germany

[21] Appl. No.: 919,701

[22] Filed: Jun. 27, 1978

[30] Foreign Application Priority Data

Jun. 30, 1977 [DE] Fed. Rep. of Germany ....... 2729545

[51] Int. Cl.² ............................................. F16D 43/20
[52] U.S. Cl. ..................................... 192/56 R; 64/29
[58] Field of Search ................ 192/56 R; 64/29, 28 R

[56] References Cited

U.S. PATENT DOCUMENTS

| 3,185,275 | 5/1975 | Orwin | 192/56 R |
| 3,305,058 | 2/1967 | Orwin et al. | 192/56 R |
| 3,429,407 | 2/1969 | Orwin et al. | 64/29 X |
| 3,546,897 | 12/1970 | Kenny | 64/29 |
| 4,075,873 | 2/1978 | Geisthoff | 192/56 R |

Primary Examiner—Roy D. Frazier
Assistant Examiner—Robert W. Gibson, Jr.
Attorney, Agent, or Firm—Toren, McGeady and Stanger

[57] ABSTRACT

An overrunning clutch assembly for limiting torque transmission therethrough operates to disengage driving interengagement between a driven member and a driving member when a predetermined torque transmission level has been exceeded. A shift ring is interposed between the driving and driven members, with driving engagement between the shift ring and the driving member being effected by engagement between roller bodies mounted on the driving member and indented tracks formed in the shift ring, which operate to release driving engagement between the shift ring and the driving member when the predetermined torque level is exceeded. The shift ring is also adapted to be engaged and disengaged with the driven member by axial movement of the shift ring. The assembly also includes a control ring defining cam surfaces in the form of cutouts on the control ring. Pins formed on the driving member and on the shift ring engage the cam cutouts and when the driving member disengages from the shift ring as a result of achievement of the maximum torque transmission level, the pins on the driving member cause the control ring to rotate whereby the cam cutouts of the control ring engage pins of the shift ring to cause axial movement thereof and consequent disengagement from the driven member. The clutch may be reengaged by remote manual operation.

19 Claims, 14 Drawing Figures

TORQUE LIMITING CLUTCH ASSEMBLY WITH FREEWHEELING ACTION

BACKGROUND OF THE INVENTION

The present invention relates generally to clutch assemblies and more particularly to a clutch assembly of the overrunning type whereby when a maximum level of torque transmission through the clutch is achieved, the clutch will automatically disengage thereby to limit the torque transmission therethrough.

More specifically, the invention relates to the type of clutch assembly wherein a driving member and a driven member are arranged with a shift ring interposed therebetween with axial movement of the shift ring operating to effect engagement and disengagement of the driving and driven members. Generally, the shift ring may be positively engaged and disengaged with the driven member by devices which effect engagement and disengagement by axial movement of the shift ring. However, engagement of the shift ring with the driving member is generally determined by the amount of torque transmission which is established. When the upper level of torque transmission has been achieved, the driving member may disengage from the shift ring thereby causing, by appropriate mechanisms, axial movement of the shift ring to also disengage the shift ring from the driven member.

On one known prior art assembly of this type, for example a torque limiting clutch with freewheeling action known from German DT-AS No. 2,540,489, there is provided a torque limiting clutch consisting of a driving and a driven clutch member between which a shift ring is arranged for torque transmission. The shift ring is axially moveable and is provided with sectional or castellated-type driving members which effect interengagement between the shift ring and one of the clutch members. When a predetermined torque is exceeded, the shift ring disengages. In the case of this known embodiment, the shifting action of the shift ring is effected as a result of spring-loaded shift pins.

A disadvantage of known embodiments of this type is that there is provided a spring which is arranged between one clutch member and the shift ring which rests against both parts during the freewheeling action of the clutch assembly by creating a frictional force. This results in undesired heat generation in the clutch as well as creating the danger that the clutch may shift again into the driving mode because of the residual frictional forces which are developed.

Because of the use of spring-loaded shift pins in such known torque limiting clutches, and because the springs which are provided tend to create forces acting against other springs which are arranged between the shift ring and one of the clutch members, it becomes necessary that the springs be designed with certain spring characteristics so that the forces which are developed may be balanced. Obviously, this can be a very difficult requirement to fulfill particularly where mass production techniques must be utilized.

Further considerations which arise during the operation of prior art torque limiting clutch assemblies relate to the fact that after the clutch disengages as a result of reaching a predetermined level of torque transmission, the clutch must be reengaged manually into the driving position. For this purpose, the shift ring is provided with shift bores at its outer circumference. In the operation of such prior art devices, a pin may be inserted into the shift bores and the clutch may be reengaged by turning the shift ring against the sense of rotation. However, this operation tends to become tedious and gives rise to disadvantages since, for example, in the case of a tractor vehicle, the driver must leave his seat or the reengagement operation of the clutch must be performed by a second operator.

Thus, it will be found that in clutch assemblies of the prior art several disadvantages of the type discussed above will arise and it is, accordingly, the aim of the present invention to overcome problems of this nature.

SUMMARY OF THE INVENTION

The present invention is intended to operate as a torque limiting clutch which will obviate generation of residual forces within the clutch assembly when the clutch is in the freewheeling or disengaged position. Furthermore, the invention seeks to provide a clutch which can be reengaged, after it has automatically disengaged into the freewheeling position, with convenient manipulation by an operator, for example by manipulation from the driver's seat of a tractor or similar vehicle. Moreover, the clutch of the present invention is adaptable to use for rotation and torque transmission in two directions of rotation. This can be accomplished by exchanging a single component of the clutch. Furthermore, the invention enables utilization of positive interengagement means such as sectional or castellated type driving or connection devices.

Structurally, the invention is composed of an overrunning clutch assembly which operates to limit the maximum torque transmission therethrough and which includes a driving member and a driven member with a shift ring interposed between the driving and driven members to be axially moveable relative thereto between a driving position and a disengaged or freewheeling position. The shift ring is axially shifted by operation of a control ring which extends about both the shift ring and the driving member of the clutch and which is actuated to effect shifting of the shift ring by engagement with shift pins arranged in the outer circumference of the driving member and of the shift ring. The control ring is formed with cutout portions which operate as cam surfaces. Guide pins formed on the outer circumference of the driving member engage the cam surfaces or cutout of the control ring. Additionally, shift pins formed on the outer surface of the shift ring also engage the cutout cam surfaces of the control ring. Spring means interposed between the control ring and the shift ring operate to maintain these members in a stable position relative to each other. Saw-toothed recesses are provided at that side of the control ring which faces toward the clutch hub. Recesses engaging guide pins or the like are arranged on the outer circumference of the clutch hub in such a manner that, when the guide pins rest against a stop face of the recess facing away from the direction of drive, the position for torque transmission is ensured and, when the guide pins rest against a stop face of the recess facing toward the direction of drive, the freewheeling position is effected. At least one control face is arranged at the control ring in such a manner that the control face and the clutch axis form an angle toward the direction of rotation which is smaller than 90°.

A special advantage of the embodiment of the present invention is that the control face extending at an angle relative to the axis of the clutch effects a positive disengagement of sectional driving members from each other. Moreover, due to fact that the guide pins rest against the stop faces of the saw-toothed recesses facing toward the direction of drive, the recesses also extending at an angle relative to the axis of the clutch, the control ring together with the shift ring in the freewheeling position are kept in such a position that the sectional driving members can freely rotate past each other.

In a possible modification of the invention, a member rigidly connected to the shift ring rests, when in the drive position, against that side of the control face which faces toward the driven clutch member.

In a further possible embodiment of the invention, the control face is arranged at a cover ring rigidly against rotation connected to the control ring, and the saw-toothed recesses of the control ring and the control faces of the cover ring and the connecting webs assigned to the cover ring are combined to form a zig-zagged groove in which the guide pins are moved.

The aforementioned embodiments have in common the characteristic that the restoring force acting on the shift ring effects a complete declutching or releasing of the torque limiting clutch. The clutch hub or driving member continues to rotate but will no longer transmit residual moment to the driven clutch member.

In a further modification of the first embodiment, the cutouts forming the cam surfaces on the control ring may be configured to be open toward the saw-toothed recess.

This measure facilitates simple exchange of the control ring in order, for example, to enable change in the direction of drive of the torque limiting clutch.

In a special embodiment of the invention, the sectional driving members may be constructed as cylindrical bolts which are arranged at those ends of screws which face toward the shift ring.

With this measure, the cumbersome production of the sectional driving members is made significantly less expensive. Additionally, when bolts are worn out they can be easily exchanged and replaced by a simple replacement of screws. Also, in such a case, a high-grade material may be utilized for the sectional driving members without significantly increasing the material costs of the clutch.

In an advantageous manner, the control ring and, if necessary, a cover ring which is provided in one embodiment of the invention, are arranged exchangeably with other similar elements, the control faces and the saw-toothed recesses of the two interchangeable control rings and, if necessary, cover rings being arranged mirror inverted relative to the longitudinal axis of the clutch.

As a result, the range of application of the torque limiting clutch is widened, since the clutch may be effective in both directions of rotation by a simple exchange of control rings.

In a further modification of the invention, an operating flange extending radially outwardly from the control ring may be provided at the outer circumference thereof.

In one exemplary embodiment of the invention, a gearshift fork or other suitable means acting on the operating flange may be adapted to effect re-engagement of the torque limiting clutch in the driving position by remote operation thereof.

On a special modification of the second embodiment of the invention, the guide pins rotatively affixed to the clutch hub are, in the driving position, arranged in a pocketshaped recess which, in the direction opposite the direction of rotation, is located adjacent to the saw-toothed recess in such a manner that the guide pins are freely moveable in the pocket-shaped recess.

Because of this structural design of the torque limiting clutch of the invention, a freewheeling function is assigned to the clutch. Such a freewheeling function is desirable, for example, in driving heavy implements in order to avoid overloading the drive line due to reverse rotary oscillations or due to leading of the driven implement.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF PREFERRED EMBODIMENTS

Figure 1:
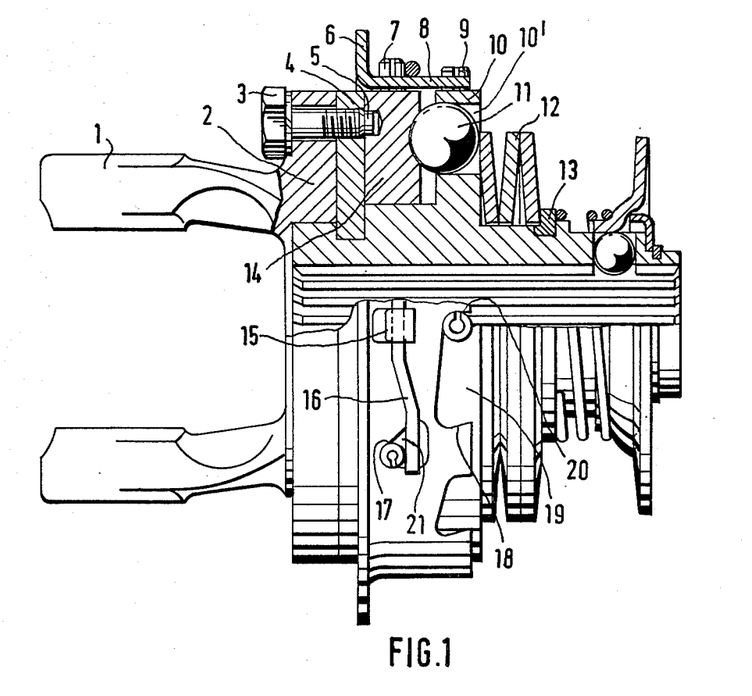
FIG. 1 is a partial sectional view depicting a first embodiment of a torque limiting clutch in accordance with the present invention.
Figure 1A:
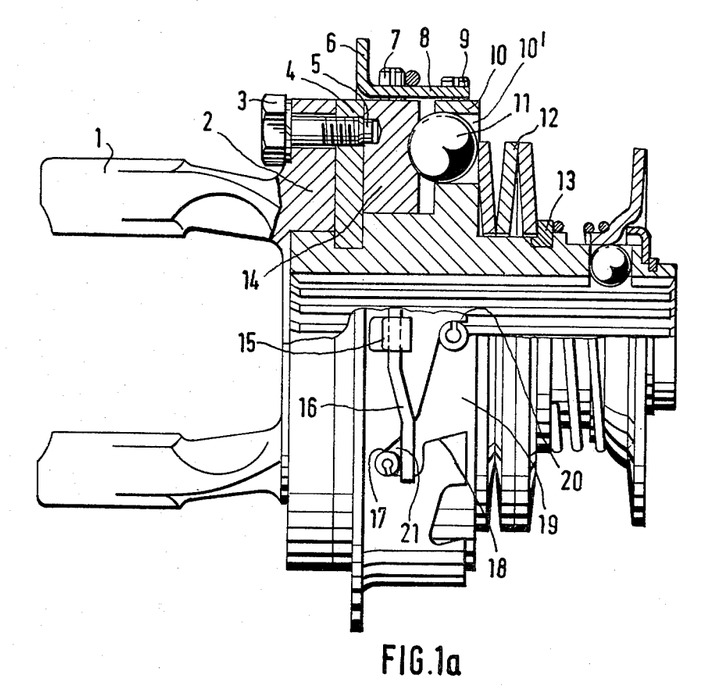
FIG. 1a is a partial sectional view depicting the embodiment of FIG. 1 with slight modifications.
Figures 2, 3:
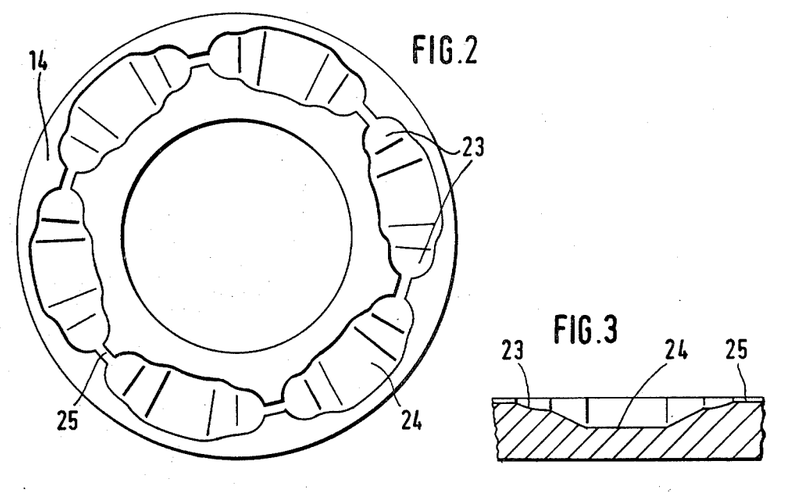
FIG. 2 is a plan view of the shift ring utilized with the assembly of the present invention.
FIG. 3 is a sectional view through the shift ring of FIG. 2.

Referring now to the drawings, wherein like reference numerals are used to identify similar parts throughout the various figures thereof, there is shown in FIGS. 1-8 a first basic embodiment of the invention, with FIGS. 1 and 1a depicting some modification in this basic embodiment.

In the embodiment depicted in FIGS. 1 and 1a, a universal joint fork 1 is connected to an axial safety member 4 through a flange 2 by means of screws 3. The axial safety member 4 and the flange 2 are arranged to be freely rotatable upon a clutch hub 10 which operates as the driving member of the torque limiting or over-running clutch assembly shown in the drawings. In FIGS. 1 and 1a, cylindrical bolts 5 are arranged at the ends of the screws 3. The bolts 5 protrude from the axial safety member 4 by a predetermined distance in the direction of a shift ring 14 comprising the shift ring means of the present invention.

The shift ring 14 is provided with bores distributed over the circumference thereof with the position of each of the bores corresponding to the position of the cylindrical bolts 5. Accordingly, the assembly including the members 1, 2 and 4 may be placed in rotary driving engagement with the shift ring 14 by axial movement of the shift ring 14 leftwardly as viewed in FIGS. 1 and 1a whereby the bolts 5 may engage within the bores formed in the shift ring 14 with movement of the shift ring 14 rightwardly as viewed in FIGS. 1 and 1a operating to disengage this positive-type locking rotary motion between these parts.

The shift ring 14 is provided at its outer circumference with shift pins 7 which are fixedly arranged thereon.

The clutch hub member 10 is similarly provided with guide pins 9 formed on the outer periphery thereof.

Between the shift ring 14 and the clutch hub 10 there is operatively interposed a control ring 8 constituting the control ring means of the present invention. The control ring 8, as will be more clearly and fully described hereinafter, is formed with a cutout configuration which operates to define cam surfaces within which the pins 7 and 9 may engage during the operation of the invention, which will likewise be more clearly described hereinafter. Thus, the pins 7 and 9 may be considered to be follower means with the pins 9 hereinafter referred to as first follower means and the pins 7 hereinafter referred to as second follower means.

As will be seen from the drawings, the cutout portions of the control ring 8 forming the cam means of the invention are differently structured in the embodiments of FIGS. 1 and 1a, this being the basic difference therebetween. The embodiment of FIG. 1 includes cutout portions 21 within which the pins 7 are engaged which are totally enclosed. In the embodiment of FIG. 1a, the cutout portion 21 is completely open on one side thereof extending to the right as seen in FIG. 1a. The cutout portions 21 are provided with a control face 17. The control face forms an angle which is smaller than 90° relative to the axis of the clutch assembly, taken in the direction of rotation. In order to maintain the control ring 8 and the shift ring 14 in a stable position relative to each other, at least one spring 16 is provided which is supported, on the one hand, at the control ring 8 and, on the other hand, at the shift ring 14 or at parts which are rigidly connected to the rings.

At its side facing the clutch hub 10, the shift ring 14 is provided with indentations 23 and 24 distributed over the circumference thereof which form track means within which roller means such as roller balls 11 may be engaged. The indentations consist of a freewheeling zone 24 located generally centrally in each recess representing the deepest indentation and spherical indentations 23 arranged on both sides of the freewheeling zone 24, the spherical indentations 23 operating as the driving position. The individual indentations 23, 24 are connected with each other through connecting tracks 25.

The clutch hub 10 is secured against axial movement on the power take-off shaft (not shown) of a vehicle with which the clutch assembly is to be used, such as a tractor, by means of a known ball cap. In a radially extended flange of the clutch hub 10, there are arranged axially extending bores 10'. The bores 10' are distributed around the circumference of the hub 10 in the same number and distribution as the indentations 23, 24 of the shift ring 14.

The roller balls 11 are arranged within the bores 10'. Cup spring means 12 act on the balls 11 in the direction toward the shift ring 14. At their other ends the cup springs 12 are supported by an end ring 13.

As will be noted, the guide pins 9 are located on the outer circumference of the radially extending flange of the clutch hub 10 within which the bores 10' are formed. As will be indicated in more detail, the guide pins 9 engage cutouts or saw-toothed recesses provided in the control ring 8.

In describing the manner of operation of the torque limiting clutch of the invention, let it be assumed that the direction of drive of the clutch is counterclockwise, as seen from the power take-off shaft of the tractor, i.e. as viewed from the right side in FIGS. 1 and 1a.

Figure 5:
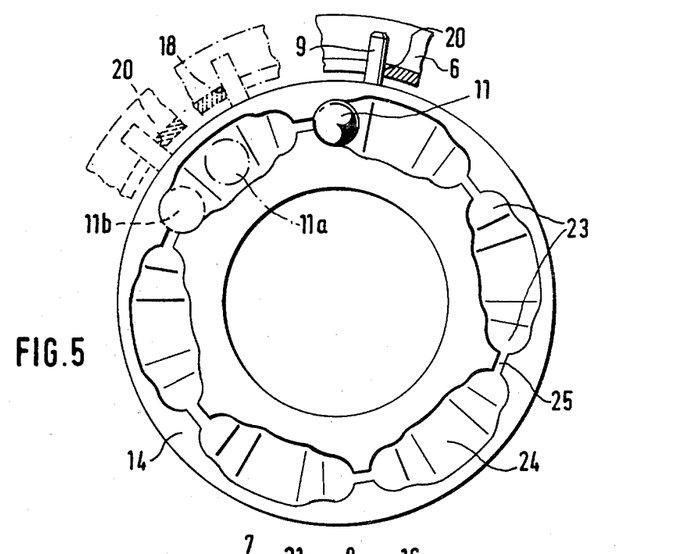
FIG. 5 is a side view showing schematically portions of the assembly of the invention in various positions of operation during different stages of the shifting action of the assembly.

In the clutch assembly in the engaged position whereby a torque transmission therethrough may be effected, the balls 11 are placed in the left spherical indentations 23 in order to establish driving engagement, as depicted in FIG. 5. With the clutch assembly in this position, the guide pins 9 will rest against stop faces 20 formed as part of the cam means or cutout means of the control ring 8, with the stop faces 20 being arranged to face opposite to the direction of rotation. Thus, the control ring 8 including the shift ring 14 are locked against unwanted rotation opposite to the direction of drive relative to the clutch hub 10. As a result, the torque limiting clutch will not be actuated back into the freewheeling position which might occur, for example, as a result of rotary oscillations or leading of the drive.

The shift ring 14 and the control ring 8 are maintained in a stable position relative to each other during driving engagement of the clutch by means of the spring 16 which rests against the two rings.

When the rated torque of the assembly is exceeded, the balls 11 will be moved against the force of the cup springs 12 until they overcome the connecting tracks 25 and fall into the freewheeling zone 24 of the adjacent indentations on the left thereof. Simultaneously, the guide pins 9 will move toward stop faces 18 formed in the control ring 8 as part of the cutout portions or cam surfaces thereof. The stop faces 18 are located in the direction of drive of saw-toothed recesses 19, and since the clutch hub 10 continues to rotate at an unchanged speed there is brought about an angular rotation between the clutch hub 10 and those parts of the torque limiting clutch which are slowed by the rated torque.

Figure 7:
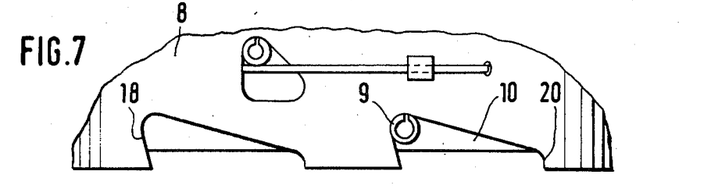

As a result of the freewheeling action of the balls 11 relative to the shift ring 14, the first follower means or pins 9 engage the stop faces 18, as best seen in FIG. 7, and thereby effect rotation of the control ring 8 in the direction of drive of the hub 10. The restraining torque acting on the gearshift fork 1 and consequently on the shift ring 14 which is positively connected with the gearshift fork 1, forces the shift pins 7 to slide along the obliquely extending control faces 17 formed as part of the cam means on the control ring 8. As a result, the shift ring 14 and the control ring 8 are forced to move axially in a direction toward the clutch hub 10.

Because of this axial movement of the shift ring 14, the positive interlocking engagement existing between the member 4 and the shift ring 14 is disengaged. That is, because the shift ring 14 moves to the right as viewed in FIGS. 1 and 1a, as a result of engagement of the second follower means or pins 7 along the cam surface 17, the pins 5 will be disengaged from the bores formed in the shift ring 14 and as a result the driven member of the clutch assembly will be separated from the driving member with the force effecting the forced separation being proportional to the occurring restraining torque.

Figure 4:
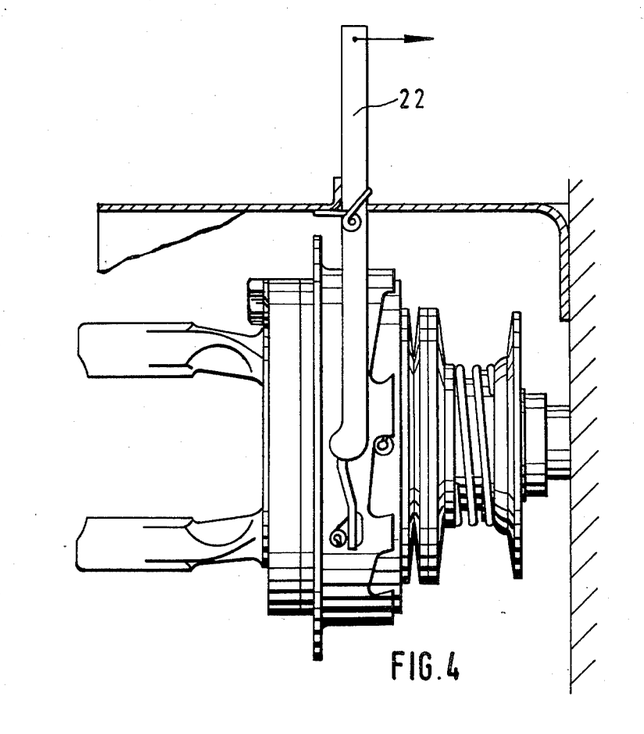
FIG. 4 is a side view of an overall assembly of a torque limiting clutch in accordance with the present invention depicting the means for facilitating remote operation thereof.
Figure 8:
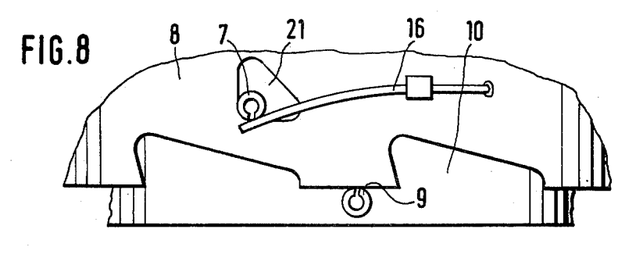

For re-engagement of the torque limiting clutch, the control ring 8 is shifted axially toward the driven side against the force of the spring 16 by means of a force acting upon a gearshift fork 22, best seen in FIG. 4. Due to the fact that the clutch hub 10 continues to rotate, the guide pins 9 will overrun the stop faces 18 and will come to rest against the end face of the control ring 8 and can slide along this end face, as seen in FIG. 8. Simultaneously, the balls 11 again occupy the driving position in the next spherical indentation 23, on the left. Each of the guide pins 9 fall, due to the influence of spring 16, into the next saw-toothed recess 19 angularly displaced in the forward direction of rotation of the hub 10, and once again rest against the stop faces 20 which are arranged to face in a direction toward the direction of drive. As a result, the operating condition of the torque limiting clutch is again established and the clutch assembly will return to the condition depicted in FIG. 1 or 1a, depending upon the embodiment utilized.

In FIG. 5, the position of the balls 11 and of the guide pins 9 is shown during different operating conditions of the clutch assembly. The balls 11 and pins 9 shown in solid line form indicate the operating position as an initial position. When the predetermined maximum torque level is exceeded, the balls 11 pass over or through the connecting tracks 25 and fall into the freewheeling position 24 of the next indentation on the left, as shown by the dash-dot representation of the ball 11a. Simultaneously, the pins 9 occupy the position indicated by the dash-dot representation thereof at the stop face 18. When the torque limiting clutch is re-engaged, the balls 11 assume the dotted position 11b in the next spherical indentation on the left, as seen in FIG. 5, as the driving position and the guide pins 9 assume the position also shown by dotted lines at the stop face 20 located opposite the direction of drive, which again corresponds to the initial position.

Figure 6:
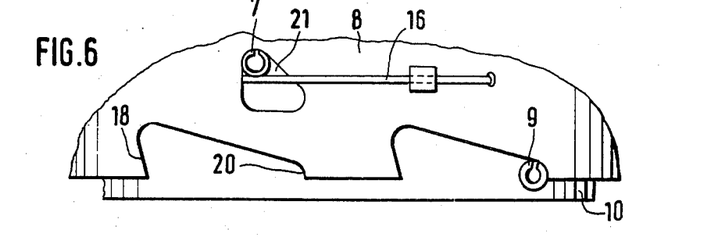
FIGS. 6, 7 and 8 are partial views of the clutch assembly of the embodiment of FIG. 1 depicting, respectively, various positions and movements of the control ring and shift ring relative to each other and movements of the shift pins and guide pins relative to the former during shifting from the driving position into the freewheeling position and subsequent re-engagement into the driving position.

FIGS. 6, 7 and 8 show relative movements of the clutch hub 10, the control ring 8 and the shift ring 14, which may be identified by the position of the shift pins 7. These figures show the position of the parts relative to each other, with FIG. 6 indicating the driving position, FIG. 7 indicating the freewheel position and FIG. 8 indicating the position during the transition from the freewheeling position into the renewed driving position.

The cutout portion 21 of the cam means, including the control face 17, can be arranged in a very simple manner in the guide ring 8, separate from the saw-toothed recess portion 19. However, it is advantageous to form the cut out portions 21 to open toward the saw-toothed recesses 19, since this facilitates mounting of the control ring 8. This is so, because in this case the control ring 8 may be slideably moved onto the torque limiting clutch without having to remove any of the pins. This has a special advantage when control rings are to be exchanged in order to reverse the direction of rotation.

In order to achieve remote operation of the torque limiting clutch assembly of the invention for the purpose of re-engagement, the operation of the gearshift fork may be carried out mechanically or, by means (not shown in the drawing) which may be electromagnetic, hydraulic or pneumatic.

Figure 9:
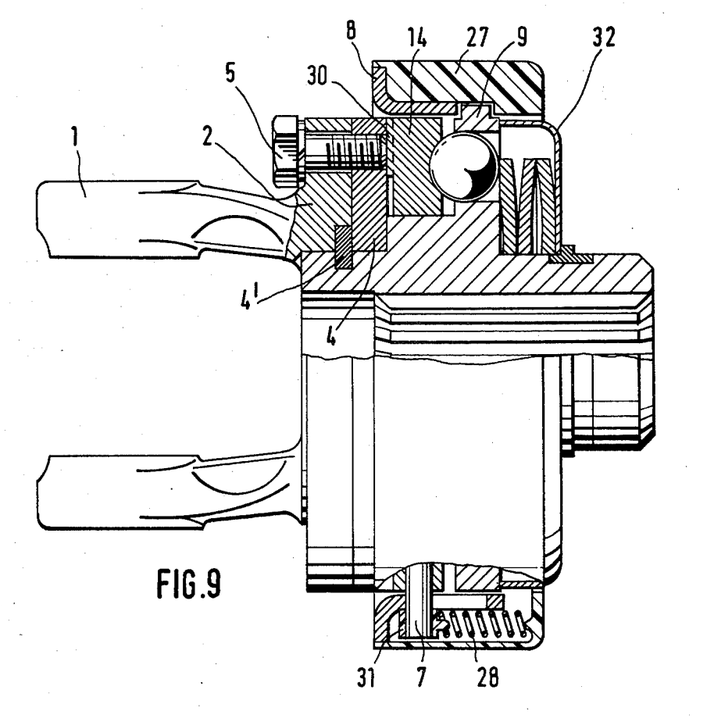
FIG. 9 is a partial sectional view depicting a further embodiment of the present invention.

FIGS. 9-13 show a second embodiment of the invention. In the embodiment of the torque limiting clutch of the present invention according to FIG. 9, essentially the same components as those described in accordance with the embodiment of FIG. 1 are provided. The forked flange 2 connected integrally with the joint fork 1 is connected to the axial safety member 4 by means of screws 5. The axial safety member 4, in turn, is axially fixed in the direction toward the joint fork 1 by means of a circlip 4'. As a positive or locking driving connection between the shift ring 14 and the axial safety member 4, a jaw clutch 30 is provided which may be radially engaged. The indentations 23, 24 at that side of the shift ring facing toward the clutch 10 are constructed as described in accordance with the preceding embodiment. The arrangement of the balls 1 in the bores 10' of the clutch hub 10 and the action of the hub springs on the balls 11 are the same as in the manner already previously described. The jaw clutch 30 may be described as comprising castellated surfaces which engage each other in order to transmit rotary motion therebetween. This arrangement of FIG. 9 is different from and is a substitute for the bolt-and-bore connection of FIGS. 1 and 1a.

The embodiment of FIG. 9 differs from the embodiment of FIG. 1 in that the control ring means of the invention are formed in two parts to include an annular control member or control ring 8 which is rigidly connected with an annular cover member or cover ring 27 which may be made of, for example, plastic. The cover ring 27 embraces or extends about the guide pins 9 arranged at the outer circumference of the clutch hub 10 in such a manner that the edge of the cover ring 27 consisting of the control faces 17 and connecting webs 26 forms a zig-zagged circumferential groove together with that edge of the control 8 which faces toward the edge of the cover ring 27. The guide pins move in this groove when the torque limiting clutch is shifted.

A spring 28 rests with one of its ends against the cover ring 27 connected to the control ring 8 with the other end of the spring resting against spring support members 31 which are positioned onto the shift pins 7.

Figures 10, 11:
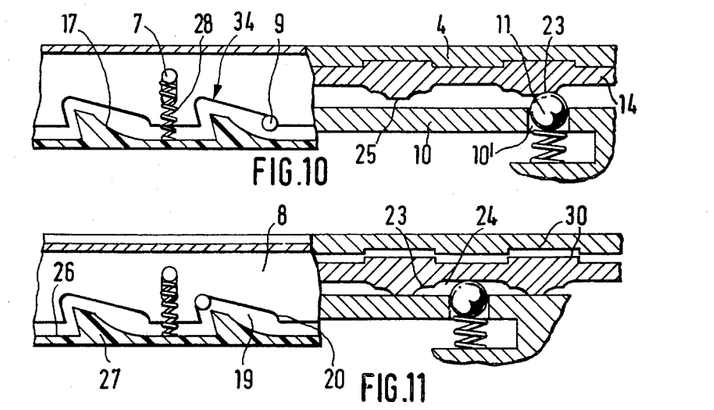
FIGS. 10, 11 and 12 are partial sectional views showing in greater detail portions of the embodiment of FIG. 9 during operation of the clutch assembly and depicting, respectively, the driving position, the freewheeling position and reengagement of the assembly.
Figure 12:
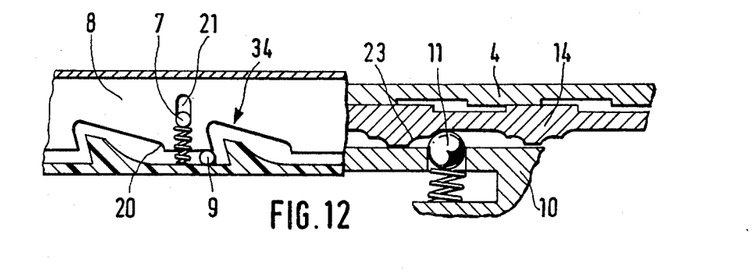

FIGS. 10-12 depict the movements of the torque limiting clutch during shifting through all stages. The movement of the balls 11 and of the shift pins 7 and the guide pins 9 are shown in a stretched representation schematically depicted side by side.

FIG. 10 shows the driving position. The balls 11 are in the spherical indentations 23 on the left and are able to transmit torque in a direction to the left, as seen in the drawing. The guide pins 9 rest against that stop face 20 of the saw-toothed recesses 19 of the control ring 8 which face away from the direction of rotation. The control ring 8 and the shift ring 14 support each other by means of the springs 28 through the cover ring 27 on the one hand and the shift pins 7 on the other hand. When rated torque is exceeded, the balls 11 overcome the connecting tracks 25 and fall into the adjacent freewheeling zone 24, on the left. Simultaneously, the guide pins 9 connected to and rotating with the clutch hub 10 run against the control faces 17 and pull the cover ring 27 back toward the driving side. Simultaneously, the control ring 8, rigidly connected with the cover ring 27, is pulled back. The control ring 8 drives the shift ring 14 through the shift pin 7 and, thus, positively pulls apart the sectional or castellated driving members 30. Because of the fact that the clutch hub 10 continues to rotate, the guide pins 9 rest against those stop faces 18 of the saw-toothed recesses which are located in the direction of drive.

Due to the internal friction of the shift ring 14 and the axial safety member 4 on the clutch hub 10, a certain torque is transmitted to the control ring. Since the stop face 18 of the saw-toothed recesses 19 and the axis of the torque limiting clutch form an angle in such a manner that the guide pins 9 spend themselves, so to speak in the saw-toothed recess 19 at the stop face 18, the pull-back effect is maintained finally up to the shift ring 14 and the clutch remains in the freewheeling position. The relative axial position of the control ring 8 relative to the shift ring 14 is not changed during the transition from the driving position into the freewheeling position of the torque limiting clutch.

For re-engaging the torque limiting clutch of the invention, the cover ring 27 including the control ring 8 are moved toward the driven side against the force of the spring 28. Thus, once again, a torque is generated which forces the balls 11 into the spherical indentations 23 on the left side and into the driving position. The shift pins 7 are moved at the same time relative to the control ring 8 and they rest against the other side of the cutout 21. The guide pins 9 can move along the outer edge of the control ring 8 until they fall into the next saw-toothed recess 19 on the left of the shift ring 8 and rest against the stop faces 20 facing away from the drive direction. The driving position is now re-established.

Figure 13:
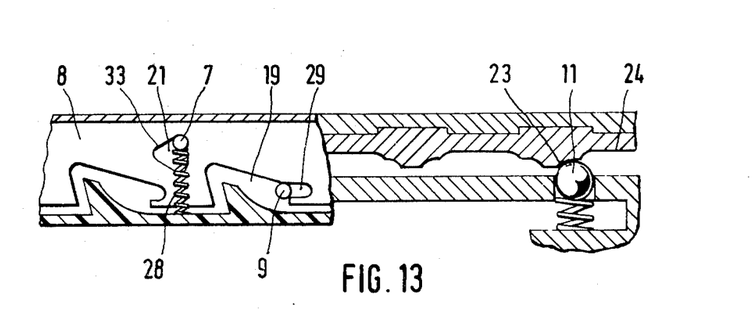
FIG. 13 is a partial sectional view showing a further embodiment of the invention involving some modifications from the arrangement shown in FIG. 9.

FIG. 13 shows a torque limiting clutch with an additional freewheeling characteristic. The saw-toothed recess 19 has a pocket-shaped recess 29 at the end thereof facing away from the drive. The guide pin 9 is moveably guided in this pocket-shaped recess 29. When the driven member leads relative to the drive, the balls 11 can withdraw into the freewheeling position 24 situated at the right hand side. In this case, the guide pins 9 move into the pocket-shaped recess 29 until the stop is reached. The shift pins 7 move correspondingly in the recess 21 along the oblique face of the driving side. Thus, the tension of the spring 28 is increased. The sectional driving members 30 are thus kept in engagement. When the drive has made up the lead, the balls 11 once again fall into the spherical recesses 23 and the torque limiting clutch is again in driving position.

While specific embodiments of the invention have been shown and described in detail to illustrate the application of the inventive principles, it will be understood that the invention may be embodied otherwise without departing from such principles.

What is claimed is:

1. An overrunning clutch assembly for limiting torque transmission therethrough comprising:
    a driving member;
    a driven member;
    shift ring means interposed between said driving and driven member to be axially moveable relative thereto between a driving position, where said shift ring means operates to transmit torque from said driving member to said driven member, and a freewheeling position whereby torque transmission between said driven and said driving member is disengaged, said shift ring means moving to said freewheeling position when a predetermined level of torque transmission through said clutch assembly is exceeded;
    track means defining in said shift ring means circumferentially extending indentations;
    roller means operatively mounted on one of said driving and driven members in position to engage said track means;
    said track means including first portions thereof adapted to be engaged by said roller means when said shift ring means is in said driving position to effect transmission of torque between said shift ring means and said one of said driving and driven members, and second portions thereof enabling freewheeling action between said shift ring means and said one of said driving and driven members whereby said shift ring means is placed in said freewheeling position;
    said track means being configured to effect said freewheeling action when torque applied between said one of said driving and driven members and said shift ring means exceeds a predetermined level;
    control ring means operatively interposed between said shift ring means and said one of said driving and driven members;
    cam means defined on said control ring means;
    first follower means on said one of said driving and driven members for engaging said cam means;
    second follower means on said shift ring means for engaging said cam means; and
    spring means interposed between said shift ring means and said control ring means for urging them toward a given position relative to each other;
    said cam means being configured to effect axial movement of said shift ring means relative to the other of said driving and driven members to cause disengagement therebetween as a result of interengagement between said second follower means and said cam means, said interengagement occurring by virtue of engagement of said first follower means with said cam means effected when freewheeling engagement between said roller means and said track means occurs.

2. An assembly according to claim 1 including a clutch axis wherein said cam means include a portion thereof engaging said second follower means, said portion being arranged to extend at an angle less than 90° relative to said clutch axis taken in the direction of rotation.

3. An assembly according to claim 1 including means resiliently urging said roller means into engagement with said track means.

4. An assembly according to claim 1 wherein said one of said driving and driven members having said roller means mounted thereon is said driving member.

5. An assembly according to claim 4 including bolt means interposed between said driven member and said shift ring means for enabling driving engagement and disengagement therebetween by relative axial movement of said shift ring means.

6. An assembly according to claim 4 including castellated opposed interengaging surfaces interposed between said driven member and said shift ring means for enabling driving engagement and disengagement therebetween by relative axial movement of said shift ring means.

7. An assembly according to claim 4 wherein said roller means comprise bores spaced circumferentially about said driving member and rolling balls mounted within said bores.

8. An assembly according to claim 4 wherein said cam means comprise cutout portions formed in said control ring means and wherein said first and second follower means comprise, respectively, guide pins and shift pins formed, respectively, on said driving member and on said shift ring means, said guide pins and said shift pins being adapted to be placed in engagement with different parts of said cutout portions.

9. An assembly according to claim 8 wherein said cutout portions comprise first stop faces arranged to face away from the driving direction of rotation of said driving member, and having said guide pins resting thereagainst when said shift ring means is in said driving position for torque transmission, and second stop faces facing toward the driving direction of rotation of said driving member, said guide pins moving into abutting engagement with said second stop faces when said freewheeling action is established.

10. An assembly according to claim 1 comprising an operating flange extending radially outwardly from said control ring means.

11. An assembly according to claim 1 including means for enabling manual shifting of said shift ring means from said freewheeling position to said driving position, said clutch assembly thereby operating to reestablish and maintain torque transmission between said driving and said driven members until said predetermined level of torque is again exceeded.

12. An assembly according to claim 1 wherein said control ring means comprise a single annular control member extending generally concentrically about the outer peripheries of both said shift ring means and said one of said driven and driving members, and having a width dimension extending axially to both said shift ring means and said one member.

13. An assembly according to claim 1 wherein said control ring means comprise a pair of annular control members arranged to extend generally concentrically about said shift ring means and said one of said driving and driven members, and wherein at least a portion of said cam means are defined by opposed facing surfaces formed, respectively, on both said control members of said pair.

14. An assembly according to claim 13 wherein said cam means include cam surfaces formed as cutout portions on one of said pair of annular members, said second follower means being engaged between said opposed facing surfaces and said first follower means being engaged within said cutout portions.

15. An assembly according to claim 4 wherein said control ring means comprise an annular control member (8) and an annular cover member (27) rotatively fixed relative to each other; wherein said cam means are formed to include control faces (17) formed on said annular cover member (27) which extends relative to the axis of rotation of said clutch assembly at an angle smaller than 90° taken in the direction of rotation; wherein said annular control member (8) is formed to define saw-toothed recesses (19); wherein said control faces (17) and said saw-toothed recesses (19) are combined to form a zig-zagged groove (34); and wherein said first follower means comprise pins (9) rigidly mounted upon said driving member and arranged for engagement within said zig-zagged groove (34).

16. An assembly according to claim 4 wherein said cam means comprise cutout portions formed on said control ring means having an open sided configuration opening in the direction of said driving member.

17. An assembly according to claim 15 wherein at least one of said annular control member and said annular cover member is arranged to be interchangeable with other similar members.

18. An assembly according to claim 17 wherein at least one of said annular control member and said annular cover member is configured to have relative to said other such member interchangeable therewith a structural configuration whereby said control faces and said saw-toothed recesses are arranged mirror inverted relative to the axis of said clutch assembly.

19. An assembly according to claim 15 wherein with said shift ring means in said driving position, said guide pins which are rotatively fixed relative to said driving member are arranged in a pocket-shaped recess (29) defined on said annular control member (8) adjacent to said saw-toothed recess (19) facing in the direction opposite the direction of rotation in such a manner that guide pins (9) are moveable in said pocket-shaped recess (29) opposite the direction of rotation.

* * * * *